(12) United States Patent
Kim

(10) Patent No.: US 6,577,303 B2
(45) Date of Patent: Jun. 10, 2003

(54) APPARATUS AND METHOD FOR DETECTING DVI CONNECTORS OF A DIGITAL VIDEO DISPLAY DEVICE

(75) Inventor: Young-Chan Kim, Anyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 139 days.

(21) Appl. No.: 09/900,162

(22) Filed: Jul. 9, 2001

(65) Prior Publication Data

US 2002/0060676 A1 May 23, 2002

(30) Foreign Application Priority Data

Nov. 17, 2000 (KR) ........................................ 2000/68440

(51) Int. Cl.[7] ................................................ G09G 5/00
(52) U.S. Cl. .................... 345/212; 345/211; 345/213; 345/147; 345/1.1; 345/3.1; 345/543; 345/545; 345/536; 345/618; 345/629; 345/12; 345/347
(58) Field of Search ................................ 345/212, 211, 345/213, 1.1, 3.1, 545, 543, 536, 629, 618, 719, 141, 339, 121, 347

(56) References Cited

U.S. PATENT DOCUMENTS 6,069,619 A * 5/2000 Kim ............................ 345/211
6,333,750 B1 * 12/2001 Odryna et al. ............... 345/629
6,377,275 B1 * 4/2002 Kim ............................ 345/618

OTHER PUBLICATIONS

*Digital Visual Interface DVI*, DDWG Digital Display Working Group, Revision 1.0, Apr. 2, 1999, pp. 1–76.

* cited by examiner

Primary Examiner—Richard Hjerpe
Assistant Examiner—Ali Zamani
(74) Attorney, Agent, or Firm—Robert E. Bushnell, Esq.

(57) ABSTRACT

An apparatus and a method for determining a type of DVI (Digital Visual Interface) connector connected to a digital video display device, wherein the apparatus utilizes a first resistor connected between a voltage source and a node; a second resistor connected between the node and a ground terminal; a DVI receptacle connected to the DVI connector, the DVI receptacle having a plurality of digital signal sockets connected to receive digital signals output from a host and a plurality of analog signal sockets connected to receive analog signals output from the host, the node being connected to a predetermined one of the analog signal sockets; and a controller connected to the node, the controller determining the DVI connector to be a DVI-D (digital only) type connector when a low voltage is detected at the node, and determining the DVI connector to be a DVI-I (digital and analog) type connector when a high voltage is detected at the node.

17 Claims, 9 Drawing Sheets

Fig. 2 *(Background Art)*

Fig. 7a
Fig. 7b
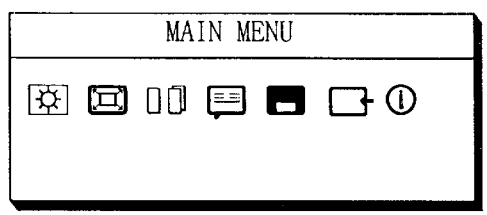
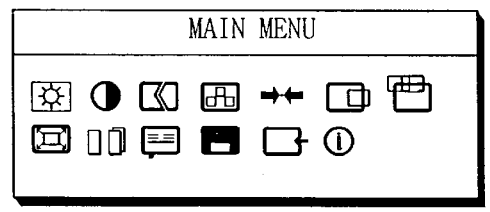

APPARATUS AND METHOD FOR DETECTING DVI CONNECTORS OF A DIGITAL VIDEO DISPLAY DEVICE

CLAIM OF PRIORITY

This application makes reference to, incorporates the same herein, and claims all benefits accruing under 35 U.S.C §119 from an application entitled Apparatus And Method For Detecting DVI Connectors Of A Digital Video Display Device earlier filed in the Korean Industrial Property Office on Nov. 17, 2000, and there duly assigned Ser. No. 2000-68440 by that Office.

BACKGROUND OF THE INVENTION

1. Field of the Invention

The present invention relates to apparatus and method for detecting a DVI (Digital Visual Interface) connector of a digital video display device, and more particularly to apparatus and method for detecting a DVI connector of a digital video display device, which establishes a switching mode according to a type of DVI connector through the detection of the type of the DVI connector connected to a digital video display device and selectively displays on a screen a video signal input from an external signal source according to the established switching mode.

2. Description of Background Art

In general, an analog video display device having a cathode ray tube (CRT) and a digital video display device having a liquid crystal device (LCD) are widely used for a desktop computer and a portable (laptop or notebook) computer. Additionally, projectors are used with desktop or laptop computers. The digital video display device inputs and displays on the screen an analog video signal or a digital video signal from a signal source such as a graphic card of the computer main body.

The Digital Display Working Group (DDWG) has announced the standards of a Digital Visual Interface (DVI). The DVI specification provides a high-speed digital connection for visual display types that is display technology independent. The interface is primarily focused at providing a connection between a computer (workstation, desktop, laptop, etc.) and its display device (CRT, LCD, projector, etc.). DVI compliant host systems may provide either a digital only interface or a combined analog and digital interface. The case that the signal source supports only digital video signals is defined as DVI-D, and the case that the signal source supports all the digital video signals and analog video signals is defined as DVI-I.

The pin arrangements of the DVI-D type connector and the DVI-I type connector are shown in FIG. 5(a) and FIG. 5(b), respectively. The two defined connectors have the same physical outer dimensions. In each case the digital signals are present, allowing a monitor with a digital interface to attach directly to either type connector, however, the receptacle of a digital only monitor will not mate with the DVI-I connector because the receptacle of a digital only monitor does not have sockets for receiving the analog pins C1–C5 of the DVI-I connector.

FIG. 5(c) shows a monitor having a receptacle supporting connection to both the DVI-D connector and the DVI-I connector. That is, in the case that a signal source supports only the digital signals, the signal source is connected to a digital video display device as shown in FIG. 5 (c) through a DVI-D signal cable having a connector as shown in FIG. 5(a) or a DVI-I signal cable having the connector as shown in FIG. 5(b). Additionally, in the case that a signal source supports only analog signals or both the digital signals and the analog signals, the signal source is connected to a digital video display device as shown in FIG. 5(c) through a DVI-I signal cable having a connector as shown in FIG. 5(b).

SUMMARY OF THE INVENTION

Accordingly, an object of the present invention to provide apparatus and method for detecting DVI connectors of a digital video display device, capable of detecting a kind of a DVI connector connected to a digital video display device, setting a switching mode according to the kind of a DVI connector, and selectively displaying on a screen a video signal input from an external signal source according to the set switching mode.

In order to achieve the above object, an apparatus according to the present invention comprises an analog video processing unit for converting into a digital video signal as an output an analog video signal input from an external signal source through a connector; a digital video processing unit for decoding a digital signal input from the external signal source through the connector into a digital video signal, a horizontal synchronous signal and a vertical synchronous signal as outputs; a video signal switching unit for outputting a digital video signal input from the analog video processing unit if a first control signal is input, and for outputting a digital video signal input from the digital video processing unit if a second control signal is input; a synchronous signal switching unit for outputting a synchronous signal input from the external signal source through the connector if the first control signal is input, and for outputting a synchronous signal input from the digital video signal processing unit if the second control signal is input; a scaling unit for signal-converting the digital video signal input from the video signal switching unit as an output according to a pre-set resolution; a panel driving unit for displaying on a panel the digital video signal input from the scaling unit; a connector detecting unit for detecting whether the connector is the DVI-D type or the DVI-I type; and a controlling unit for outputting the first control signal or the second control signal to the video signal switching unit and the synchronous signal switching unit according to the detection result of the connector detecting unit.

In order to achieve another object of the present invention, in a digital video display device for, in case of an analog switching mode, displaying on a panel a digital video signal outputted from an analog video processing unit, and for, in case of a digital switching mode, displaying on the panel the digital video signal outputted from the digital video processing unit, a method according to the present invention comprises steps of: judging whether a connector connected to the digital video display device is the DVI-D type connector or the DVI-I type connector; setting a switching mode to a digital switching mode if the connector connected to the digital video display device is the DVI-D type connector as the judgement result; judging whether a synchronous signal is input through the DVI-D type connector after setting a switching mode to a digital switching mode; normally operating the digital video display device while keeping the pre-set digital switching mode if the synchronous signal is input through the DVI-D type connector; determining the occurrence of a malfunction to the digital video display device if the synchronous signal is not input through the DVI-D type connector, and power-saving-operating the digital video display device; judging whether the synchronous signal is input through the DVI-I type connector if the connector connected to the digital video display device is the DVI-I type connector; normally operating the digital video display device while keeping the pre-set switching mode if the synchronous signal is input through the DVI-I type connector, and, if the synchronous signal is not input through the DVI-I type connector, judging whether the pre-set switching mode is the analog switching mode or the digital switching mode; re-setting the analog switching mode to the digital switching mode if the pre-set switching mode is the analog switching mode or re-setting the digital switching mode to the analog switching mode if the pre-set switching mode is the digital switching mode; and returning to the step of judging whether the synchronous signal is input through the DVI-I type connector, and, if the pre-set number of repetition times is reached, determining the occurrence of a malfunction to the digital video display device and power-saving-operating the digital video display device.

Accordingly, the present invention detects the kind of a DVI connector connected to the digital video display device, displays on the screen a video signal input from an external signal source by performing the digital switching mode in case of the DVI-D type connector, and displays on the screen the video signal input from the external signal source by repeatedly performing the digital switching mode and the analog switching mode by the pre-set number of times and maintaining the switching mode at a position where a synchronous signal input exists, so that, in case that the present invention inputs only a digital signal from the external signal source through the DVI-D type connector, the input signal detecting steps can be removed to minimize a time loss and unnecessary parameter adjustment functions can be eliminated to minimize the user's confusion.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 7(a) and 7(b) show views of menu displays on a screen according to an embodiment of the present invention.

DETAILED DESCRIPTION OF THE PREFERRED EMBODIMENTS

Hereinafter, an embodiment of the present invention will be described in detail with reference to the accompanying drawings.

Figure 1:
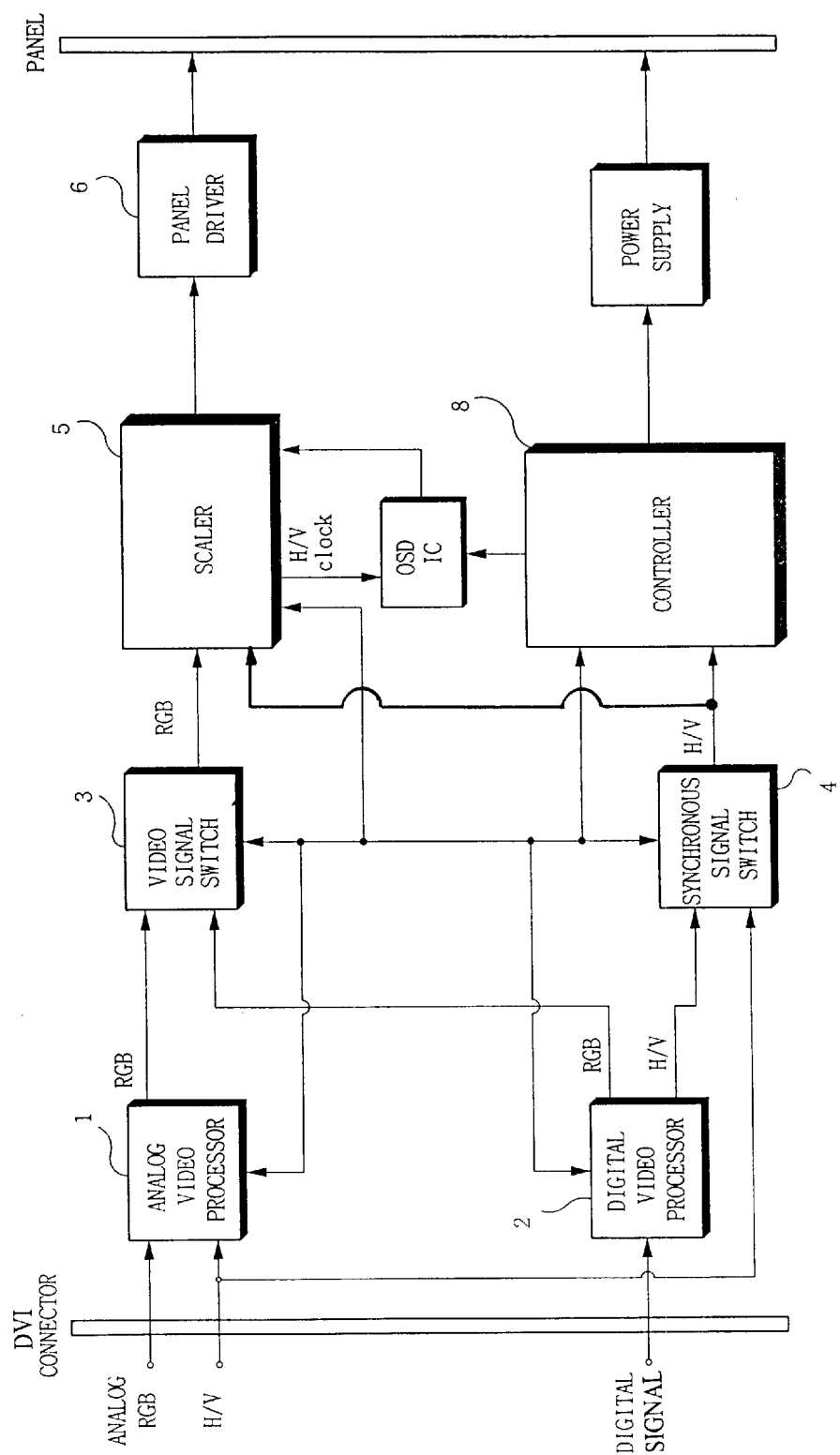
FIG. 1 is a block diagram for schematically showing a digital video display device.
Figure 2:
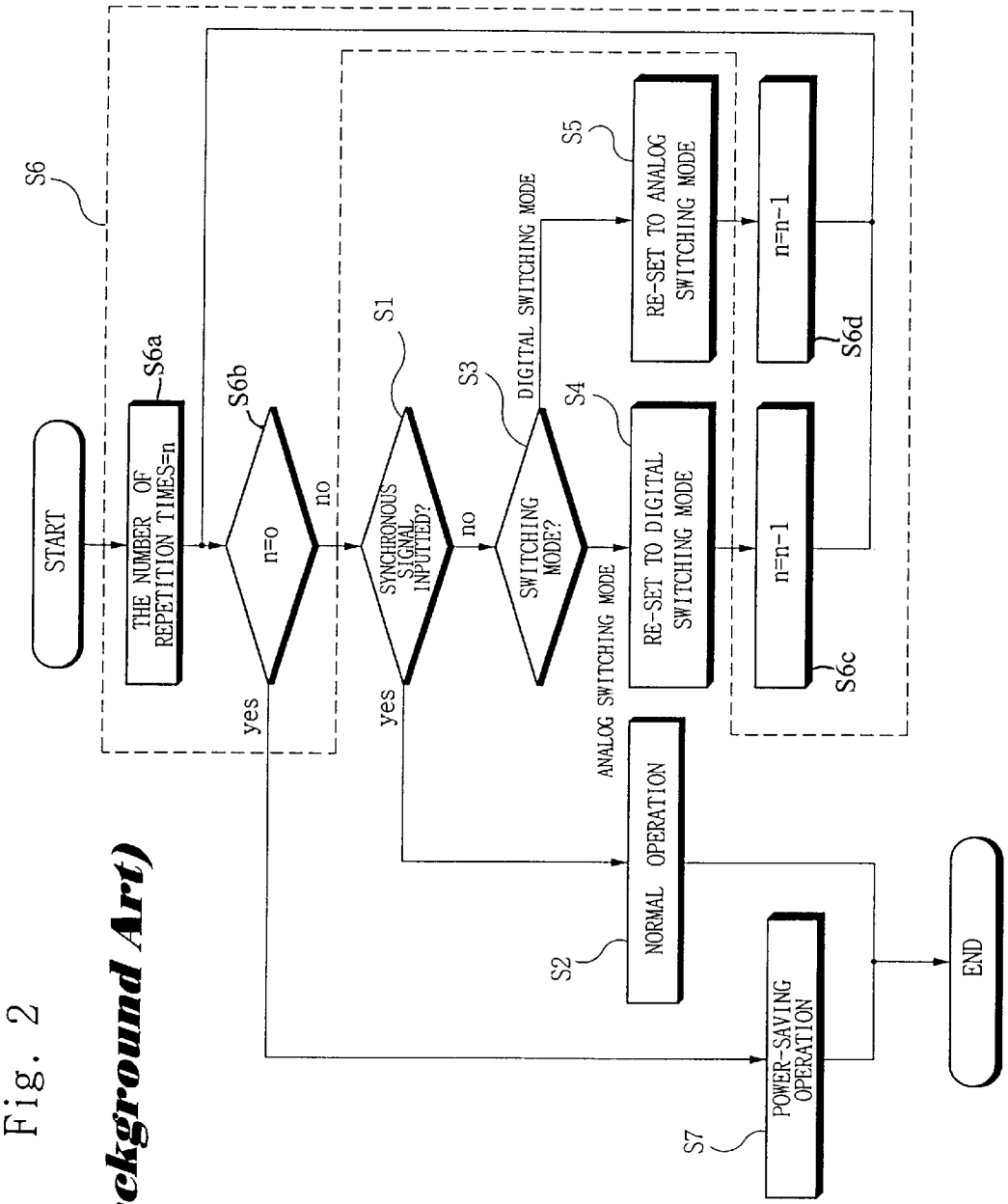
FIG. 2 is a flow chart for showing a method for detecting an input signal of the digital video display device of FIG. 1.
Figure 5A:
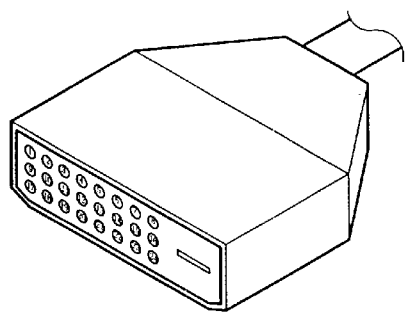
FIGS. 5(a) and 5(b) show views of a DVI-D type connector and DVI-I type connector, respectively, applied to the embodiment of the present invention.
Figure 5B:
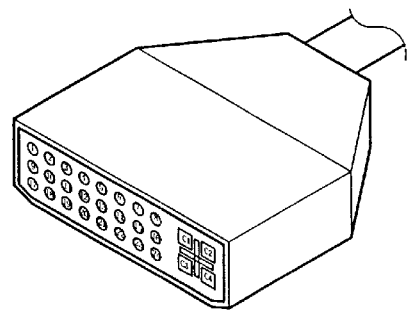

FIG. 1 is a block diagram showing a digital video display device being contemplated by the assignee of the present invention for receiving video signals from a host computer via the DVI connectors of FIGS. 5(a) and 5(b), and FIG. 2 is a flow chart for showing a method for detecting an input signal of the digital video display device of FIG. 1.

As shown in FIG. 1, the digital video display device, in case that a digital signal is input from an external signal source through the DVI-D type connector or the DVI-I type connector, includes a digital video processing unit 2 to decode the input digital signal to output a digital video signal, a horizontal synchronous signal, and a vertical synchronous signal. The horizontal and vertical synchronous signals are then applied to a synchronous switch 4.

The digital video display device also includes an analog video processor 1, in case that an analog signal is input from an external signal source through the DVI-I type connector, to convert the input analog video signal into a digital video signal. In this case, analog horizontal and vertical synchronous signals are also applied to the analog video processor 1 and to synchronous switch 4.

The converted digital video signal from the analog video processor 1 or the decoded digital video signal from the digital video processing unit 2 are selectively applied, via a video signal switch 3, to a scaler 5 to be signal-converted according to a resolution set in the scaler 5, and displayed on a panel by means of a panel driver 6.

At this time, regardless of whether the DVI-D type connector or the DVI-I type connector is connected, the digital video display device detects whether the signal, input from a signal source, is a digital signal or an analog video signal, sets a switching mode according to the detection result, w and controls video signal switch 3 and synchronous signal switch 4 according to the set switching mode, to thereby selectively display the analog video signal and the digital video signal on the screen.

Here, the input signal detection may be determined by a key input of a user or may be made at a position where there is a signal input through the sequential searches of an analog input signal and a digital input signal by means of a controller 8.

That is, as shown in FIG. 2, the controller 8 checks, a pre-set number of repetition times 'n' set in a sub-step S6a of step S6, whether a synchronous signal is input to controller 8 (S1).

The controller 8 operates the digital video display device in a normal mode while maintaining a pre-set switching mode if step S1 determines a synchronous signal is input to controller 8 (S2), and judges whether the pre-set switching mode is an analog switching mode or a digital switching mode if step S1 determines the synchronous signal is not input to controller 8 (S3).

If step S3 determines the pre-set switching mode is the analog switching mode, the controller 8 re-sets the switching mode to the digital switching mode (S4), and, if step S3 determines the pre-set switching mode is the digital switching mode, the controller 8 re-sets the switching mode to the analog switching mode (S5). Then the controller 8 reduces the pre-set number of repetition times 'n' by 1 (one) at steps S6c or S6d, checks at step S6b whether the pre-set number of repetition times 'n' is equal to 0 (zero) and returns to the step S1 to sequentially and repeatedly execute the first, second, third, and fourth steps S1, S2, S3, and S4 when it is determined in step S6b that the pre-set number of repetition times 'n' is not equal to zero.

When it is determined in step S6b that the pre-set number of repetition times is reached, i.e., 'n' is equal to zero, the controller 8 determines that a malfunction occurs and operates the digital video display device in a power-saving manner (S7).

However, I have determined that such a method for detecting an input signal, that is, steps S1 to S7, has a problem since it has a meaning only for DVI-I which supports both an analog signal and a digital signal from a signal source, but it has no meaning for DVI-D which supports only a digital signal.

That is, the digital video display device described above has a problem in that its process speed is slowed due to unnecessary operations since the steps S1 to S7 for detecting an input signal as stated above would be undertaken even in the case that the digital video display device is supplied with only a digital signal from an external signal source through the DVI-D type connector. That is, when no synchronous signal is detected controller 8 repeatedly switches synchronous signal switch 4 between an analog synchronous signal input and the synchronous signal output from digital video processor 2, however, if a DVI-D connector is applied to the video display device, then no analog synchronous signal can be applied to the video display device, thus the repeated switching of synchronous signal switch 4 by performing steps S1–S7 the pre-set number of repetition times 'n' is a waste of time.

Further, in general, the digital video display device has a function for displaying a menu screen in order for a user to directly adjust video signal parameters. Therefore, in case of an analog video signal, all the parameters such as brightness, contrast, image lock, color controls, reset, horizontal positions, vertical positions, image sizes, image effect, OSD languages, OSD positions and source selections, can be adjusted, and, in case of a digital signal, part of the parameters such as brightness, image sizes, image effect, OSD languages, OSD positions and source selections, can be adjusted.

However, the foregoing digital video display device displays a menu screen including all the parameters such as brightness, contrast, image lock, color controls, reset, horizontal positions, vertical positions, image sizes, image effect, OSD languages, OSD positions and source selections, when a menu key is toggled by a user to adjust the parameters of a received video signal regardless of whether it is an analog video signal or a digital signal. Thus, if a user selects the parameters such as contrast, image lock, color controls, reset, horizontal positions, and vertical positions displayed on the menu screen, no adjustment occurs to the corresponding parameters when a digital signal is received. Therefore, there exists a problem in that the user may consider that the video display device is not operating properly.

Figure 3:
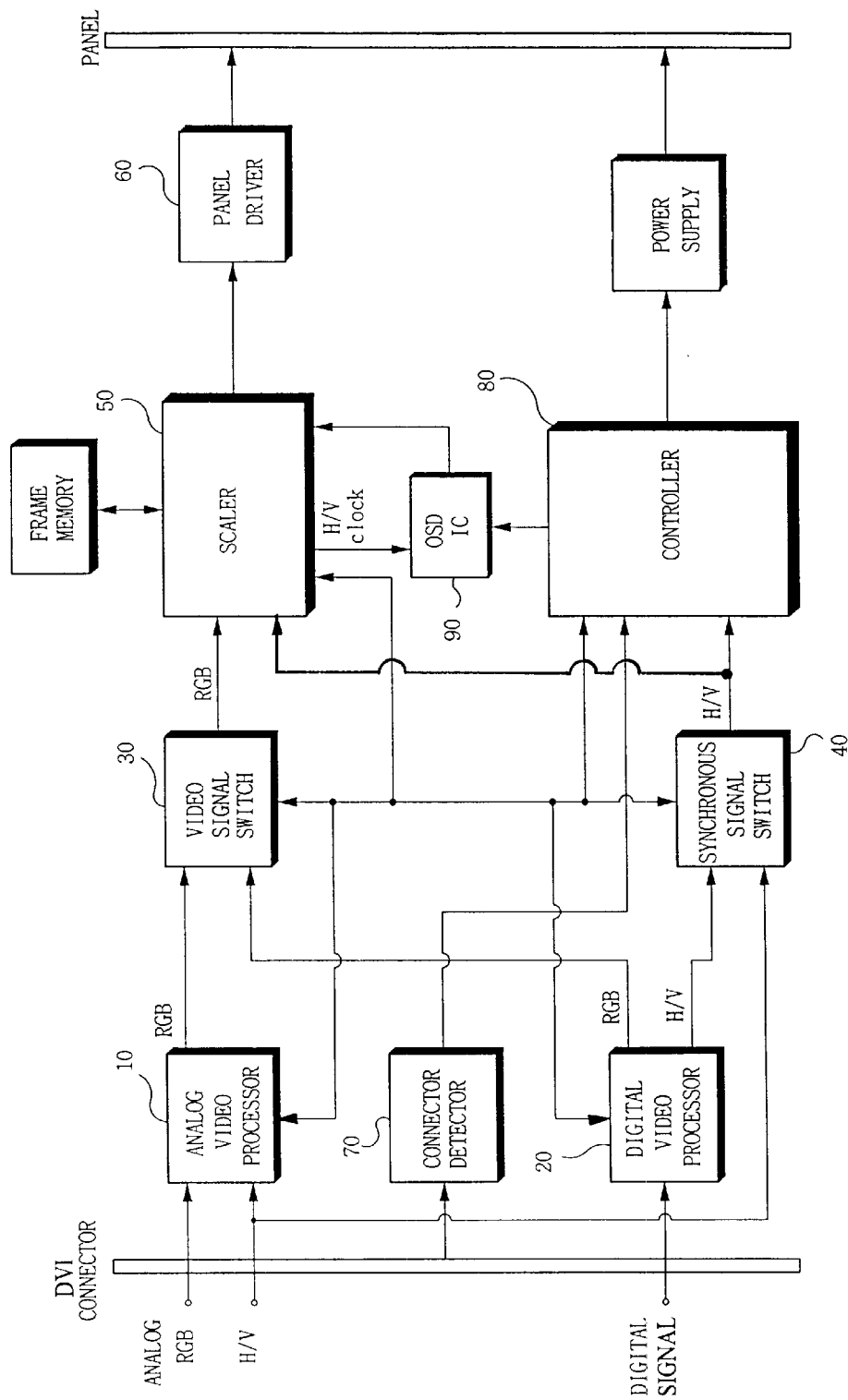
FIG. 3 is a block diagram for showing a DVI connector detecting unit of a digital video display device according to an embodiment of the present invention.

FIG. 3 is a block diagram showing a digital video display device according to an embodiment of the present invention for receiving signals from a host computer via the DVI connectors of FIGS. 5(a) and 5(b) and includes a DVI connector detecting unit.

As shown in FIG. 3, an digital video display device according to an embodiment of the present invention comprises an analog video processor 10 for converting an analog video signal input from an external signal source through a DVI connector into a digital video signal; a digital video processor 20 for decoding a digital signal input from the external signal source through the DVI connector into a digital video signal, a horizontal synchronous signal and a vertical synchronous signal as outputs; a video signal switch 30 for outputting a digital video signal input from the analog video processor 10 if a first control signal is input, and for outputting a digital video signal input from the digital video processor 20 if a second control signal is input; a synchronous signal switch 40 for outputting an analog synchronous signal input from the external signal source through the DVI connector if the first control signal is input, and for outputting a synchronous signal input from the digital video signal processor 20 if the second control signal is input; a scaler 50 for signal-converting the digital video signal input from the video signal switch 30 as an output according to a pre-set resolution; a panel driver 60 for displaying on a panel the digital video signal input from the scaler 50; a connector detector 70 for detecting whether the DVI connector is the DVI-D type or the DVI-I type; and a controller 80 for outputting the first control signal and the second control signal to the video signal switch 30 and the synchronous signal switch 40 according to the detection result of the connector detector 70. The remaining components (not labeled with reference numerals) of the digital video display device shown in FIG. 3 will not be discussed, because they are not pertinent to the present invention. Connector detector 70 will be further described below.

Figure 4:
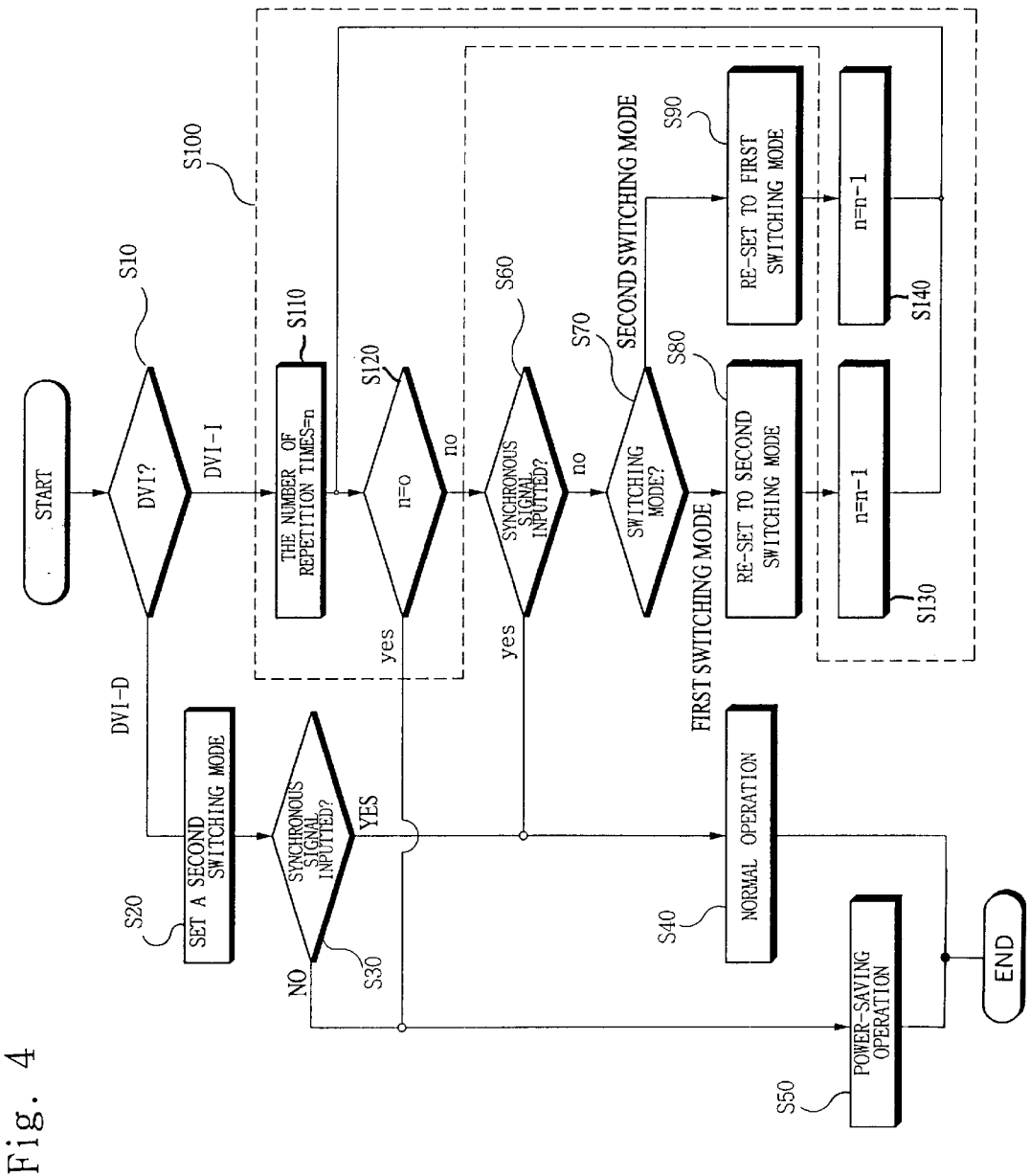
FIG. 4 is a flow chart for showing a method for detecting a DVI connector of a digital video display device according to an embodiment of the present invention.
Figure 8A:
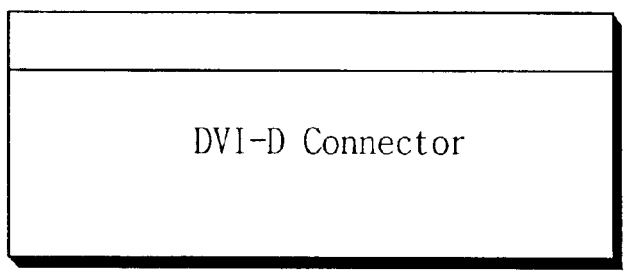
FIGS. 8(a) and 8(b) show views of message displays appearing according to an embodiment of the present invention.
Figure 8B:
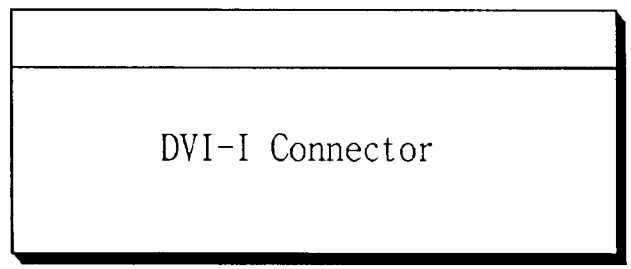

Next, an apparatus and a method according to the embodiment of the present invention will be described as follows with reference to FIGS. 4–8(b). FIG. 4 is a flow chart for showing a method for detecting a DVI connector type of a digital video display device according to an embodiment of the present invention, FIGS. 5(a) and 5(b) show views of general DVI-D type connector and DVI-I type connector applied for the embodiment of the present invention, FIGS. 6(a) and 6(b) show views of circuits of the connector detecting unit of FIG. 3, FIGS. 7(a) and 7(b) show views of menu displays on a screen according to an embodiment of the present invention, and FIGS. 8(a) and 8(b) show views of message displays appearing according to an embodiment of the present invention.

As shown in FIG. 3, the digital video display device according to the embodiment of the present invention, in case that a digital signal is input from an external signal source through the DVI-D type connector or the DVI-I type connector, decodes the input digital signal into a digital video signal, a horizontal synchronous signal, and a vertical synchronous signal in the digital video processor 20.

That is, the digital video processor 20 is realized with a TMDS (Transition Minimized Differential Signaling) receiver, which inputs a digital signal coded in the TMDS signal conversion mode from the external signal source and decodes the input digital signal into the digital video signal, horizontal synchronous signal, and vertical synchronous signal based on the TMDS signal conversion mode. Here, the TMDS signal conversion mode is a technology in which parallel data is modulated into high-speed serial data at a transmission side for transmissions and the serial data is received and decoded at a reception side.

The decoded digital video signal from the digital video processor 20 is signal-converted, if selected by video signal switch 30, at a pre-set resolution through the scaler 50 and then displayed on the panel by means of the panel driver 60.

In the meantime, the digital video display device, in case of inputting an analog video signal from an external signal source through the DVI-I type connector, converts the input analog video signal into a digital video signal at the analog video processor 10.

That is, the analog video processor 10 is generally realized with analog/digital converters (ADCs: not shown) and phase-locked loops (PLLs: not shown), which inputs the analog video signal from the external signal source and then converts the input analog video signal into a digital video signal.

The digital video signal converted from the analog video processor 10 is also signal-converted, if selected by video signal switch 30, according to a resolution pre-set in the scaler 50 and then displayed on the panel by means of the panel driver 60.

At this time, the controller 80 of the digital video display device according to an embodiment of the present invention judges whether the DVI connector is the DVI-D type connector or the DVI-I type connector, sets a switching mode according to the judgement result, controls the switches 30 and 40 according to the set switching mode.

That is, the controller 80, in case of a first switching mode, displays on the panel the digital video signal output from the analog video processor 10, and, in case of a second switching mode, displays on the panel the digital video signal output from the digital video processor 20.

Describing in more detail the operations of the digital video display device according to the embodiment of the present invention with reference to FIG. 4, the controller 80 judges whether the DVI connecter connected to the digital video display device is the DVI-D type connector or the DVI-I type connector in step S10.

Figure 5C:
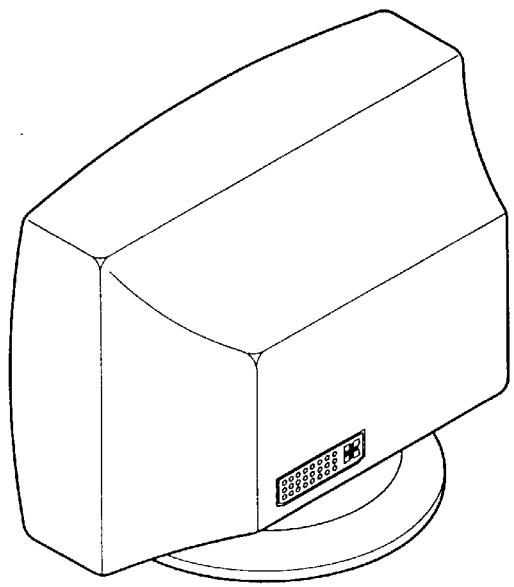
FIG. 5(c) shows a view of a monitor having a receptacle for interfacing with digital host systems, analog host systems and host systems that provide both analog and digital signal.
Figure 6A:
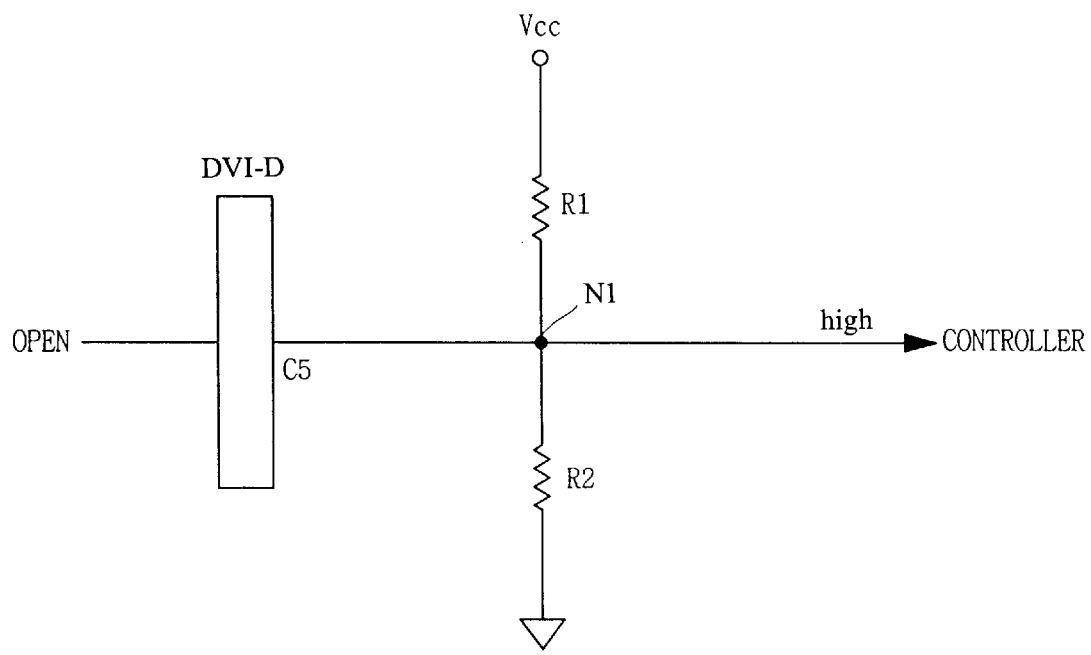
FIGS. 6(a) and 6(b) shows views of a circuit for detecting the type connector applied to the monitor of FIG. 5(c)
Figure 6B:
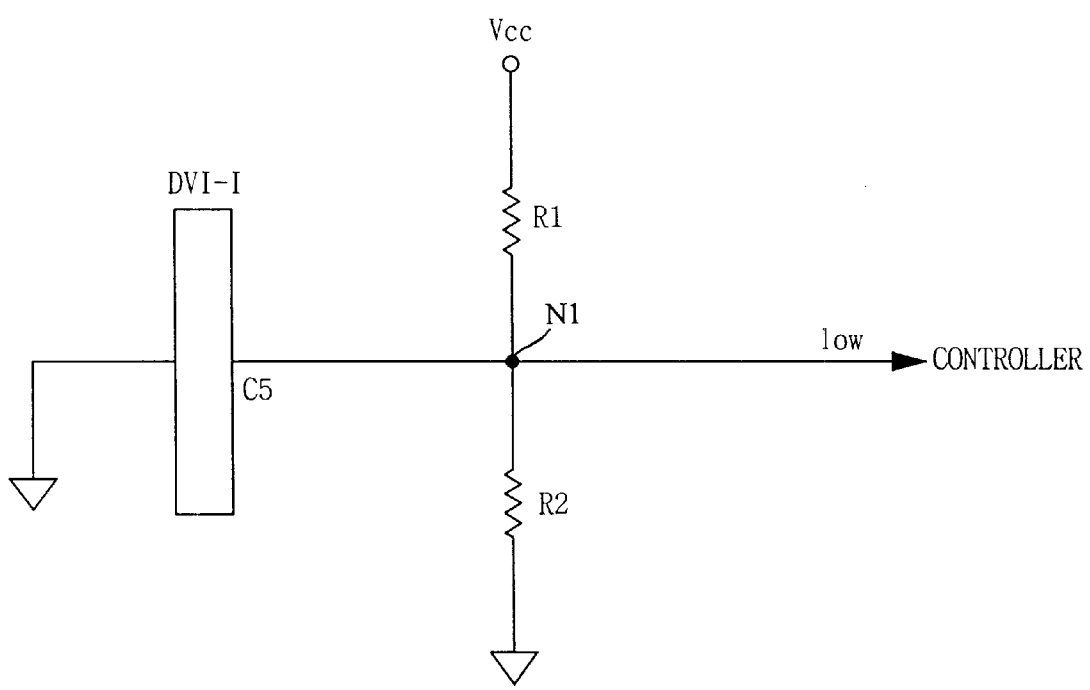

In general, as shown in FIG. 5 (*a*), the DVI-D type connector has plural pins 1–7 and 9–24 for transferring a digital signal (pin 8 has no contact), and the DVI-I type connector, as shown in FIG. 5(*b*), has plural pins 1–7 and 9–24 for transferring a digital signal and plural pins 8 and C1–C5 for transferring an analog signal, wherein pin 8 is for the analog vertical synchronous signal, pins C1–C3 are for the analog R, G and B video signals, respectively, pin C4 is for the analog horizontal synchronous signal and pin C5 is an analog ground (analog R, G and B return).

The connector detector 70 uses the characteristics of the general DVI-D type connector and DVI-I type connector as stated above. That is, as shown in FIGS. 6(*a*) and 6(*b*), the connector detector 70 is constituted with resistors R1 and R2, coupled in series at node N1 between a supply voltage Vcc and a ground terminal, wherein resistors R1 and R2 divide supply voltage Vcc. Node N1 is further connected between a socket for the analog ground pin C5 of the DVI connector and the controller 80.

Therefore, in the case that the DVI-D type connector is connected as shown in FIG. 6(*a*), there is no analog ground pin C5 thus the corresponding socket is 'open' (not grounded) and a high-level detection signal is input to the controller 80 from node N1. In the case that the DVI-I type connector is connected as shown in FIG. 6(*b*), the analog-ground pin C5 present and thus the corresponding socket becomes grounded, and a low-level detection signal is input to the controller 80 from node N1.

That is, the controller 80 judges whether the connector is the DVI-D type connector or the DVI-I connector according to the level of a detection signal input from node N1 of the connector detector 70, and then outputs the first control signal or the second control signal to the video signal switch 30 and the synchronous signal switch 40 for the first switching mode or the second switching mode, respectively.

If it is determined by controller 80 in the step S10 that the DVI connector connected to the digital video display device is the DVI-D type connector, the controller 80, in step S20, sets a switching mode to the second switching mode and then outputs the second control signal to the video signal switch 30 and the synchronous signal switch 40.

Accordingly, the video signal switch 30 outputs a digital video signal input from the digital video processor 20 to the scaler 50, and the synchronous signal switch 40 outputs the synchronous signal input from the digital video processor 20 to the scaler 50 and the controller 80.

After performing step S20, the controller 80, in the step S30, judges whether the synchronous signal is input to controller 80 from the synchronous signal switch 40. If the synchronous signal is input from the synchronous signal switch 40, the controller 80, in step S40, operates the digital video display device in a normal mode while keeping the pre-set second switching mode. Then the digital video signal input to the scaler 50 through the video signal switch 30 is signal-converted according to a set resolution and then displayed on the panel by means of the panel driver 60.

If controller 80 determines in step S30 that the synchronous signal is not input from the synchronous signal switch 40, the controller 80, in step S50, determines the occurrence of a malfunction and then operates the digital video display device in power-saving mode.

In the meantime, if it is determined in step S10 that the DVI connector connected to the digital video display device is the DVI-I type connector, the controller 80 checks in step S60, a pre-set number of repetition times 'n' set in a sub-step S110 of step S100, whether the synchronous signal is input from the synchronous signal switch 40.

If step S60 indicates that the synchronous signal is input from the synchronous signal switch 40, controller 80, in step S40, operates the digital video display device in a normal mode while keeping the pre-set switching mode.

If step S60 indicates that the synchronous signal is not input from the synchronous signal switch 40, controller 80 determines, in step S70, whether the pre-set switching mode is the first switching mode or the second switching mode. If the pre-set switching mode is the first switching mode, controller 80, in step S80, re-sets the switching mode to the second switching mode. If the pre-set switching mode is the second switching mode, controller 80, in step S90, re-sets the switching mode to the first switching mode.

Then the controller 80 reduces the pre-set number of repetition times 'n' by 1 (one) at sub-steps S130 or S140, checks at sub-step S120 whether the pre-set number of repetition times 'n' is equal to 0 (zero) and returns to the step S60 to sequentially and repeatedly execute the steps S60, S70, S80 and S90 when it is determined in sub-step S120 that the pre-set number of repetition times 'n' is not equal to zero.

When it is determined in sub-step S120 that the pre-set number of repetition times is reached, i.e., 'n' is equal to zero, the controller 80 determines that a malfunction occurs and operates the digital video display device in a power-saving mode in step S50.

When controller 80 returns to the step S60 and judges that the synchronous signal is input from the synchronous signal switch 40, controller 80, in the step S70, operates the digital video display device in a normal mode while keeping the re-set switching mode.

In the meantime, in the case that a menu key (not shown) is toggled by a user for adjusting various parameters, the controller 80 uses an on-screen display (OSD) function to control OSD IC (integrated circuit) 90. If the DVI connector connected to the digital video display device is the DVI-D type connector, the controller 80 controls OSD IC 90 to cause a first menu screen (FIG. 7(*a*)) to be displayed for adjusting the digital video signal parameters, and, if the DVI connector connected to the digital video display device is the DVI-I type connector, the controller 80 controls OSD IC 90 to cause a second menu screen (FIG. 7(*b*)) to be displayed for adjusting the parameters of the digital video signal and the analog video signal.

Here, the menu screen for adjusting the digital video signal parameters, as shown in FIG. 7(*a*), includes icons for selecting controls corresponding to brightness, image size, image effect, OSD language, OSD position, source selection, and information.

The menu screen for adjusting the parameters of the digital video signal and the analog video signal, as shown in FIG. 7(*b*), includes icons for selecting controls corresponding to brightness, contrast, image lock, color control, reset, horizontal position, vertical position, image size, image effect, OSD language, OSD position, source selection, and information.

Additionally, if the DVI connector connected to the digital video display device is the DVI-D type connector, the controller 80 controls OSD IC 90 to cause an OSD screen to be displayed for notifying a user of the connection state of the DVI-D type connector, as shown in FIG. 8(*a*). If the DVI connector connected to the digital video display device is the DVI-I type connector, the controller 80 controls OSD IC 90 to cause an OSD screen to be displayed for notifying a user of the connection state of the DVI-I type connector, as shown in FIG. 8(*b*).

Further, the controller 80, upon turning a power switch on or upon an instant re-connection after a disconnection of the connector, detects whether the connector is the DVI-D type connector or the DVI-I type connector.

As described above, the apparatus and method according to the present invention detect the kind of the DVI connector connected to the digital video display device. In case that the DVI-D type connector is connected to the digital display device, the apparatus and method execute a second switching mode to display on the screen a video signal decoded from a digital signal transmitted from a host. In this mode the apparatus and method check for an input synchronous signal. If no synchronous signal is detected, the apparatus and method determine the occurrence of a malfunction and operate the digital display device in a power saving mode until the synchronous signal is again detected. If a synchronous signal is detected, the apparatus and method operate the digital display device in a normal mode to display on the screen a video signal decoded from a digital signal transmitted from a host.

In the case that the DVI-I type connector is used the apparatus and method, check for input of a synchronous signal according to a pre-set switching mode. If the synchronous signal is detected the apparatus and method operate the digital display device in a normal mode. However, if the apparatus and method fail to detect a synchronous signal the switching mode is changed and a synchronous signal is looked for as a result of the changed switching mode. If no synchronous signal is detected after repeatedly changing between switching modes a preset number of time the second switching mode and the first switching mode by the pre-set number of repetition times the apparatus and method determine the occurrence of a malfunction and operate the digital display device in a power saving mode. When a synchronous signal is detected, the apparatus and method keep the switching mode at a position where a synchronous signal is input, to thereby display on the screen the video signal input from host.

Therefore, in case that only the digital signal is input from the external signal source through the DVI-D type connector, the switching mode detecting and changing steps can be removed to minimize a time loss, and the display of icons corresponding to unavailable parameter adjustment functions can be eliminated to minimize the user's confusion.

What is claimed is:

1. An apparatus for determining a type of DVI (Digital Visual Interface) connector connected to a digital video display device, said apparatus comprising:

a first resistor connected between a voltage source and a node;

a second resistor connected between said node and a ground terminal;

a DVI receptacle connected to said DVI connector, said DVI receptacle having a plurality of digital signal sockets connected to receive digital signals output from a host and a plurality of analog signal sockets connected to receive analog signals output from said host, said node being connected to a predetermined one of said analog signal sockets; and a controller connected to said node, said controller determining said DVI connector to be a DVI-D (digital only) type connector when a low voltage is detected at said node, and determining said DVI connector to be a DVI-I (digital and analog) type connector when a high voltage is detected at said node.

2. The apparatus as set forth in claim 1, wherein said predetermined socket is an analog ground socket.

3. The apparatus as set forth in claim 2, wherein said analog ground socket is open when the DVI-D type connector is attached between said host and said digital display device, and said analog ground socket is grounded by said host when the DVI-I type connector is attached between said host and said digital display device.

4. A digital video display comprising:

a DVI (Digital Visual Interface) receptacle; and a connector detector for determining a type of DVI connector connected between a host and said DVI receptacle, said connector detector comprising:

a first resistor connected between a voltage source and a node;

a second resistor connected between said node and a ground terminal;

said DVI receptacle having a plurality of digital signal sockets and a plurality of analog signal sockets, said node being connected to a predetermined one of said analog signal sockets; and a controller connected to said node, said controller determining said DVI connector to be a DVI-D (digital only) type connector when a low voltage is detected at said node, and determining said DVI connector to be a DVI-I (digital and analog) type connector when a high voltage is detected at said node.

5. The digital video display as set forth in claim 4, wherein said predetermined socket is an analog ground socket.

6. The digital video display as set forth in claim 5, wherein said analog ground socket is open when the DVI-D type connector is attached between said host and said digital display device, and said analog ground socket is grounded by said host when the DVI-I type connector is attached between said host and said digital display device.

7. The digital video display as set forth in claim 6, further comprising:
an analog video processor for converting an analog video signal input from said host into a first digital video signal;
a synchronous signal switch connected to receive, from said analog signal sockets of said receptacle, a first horizontal synchronous signal and a first vertical synchronous signal;
a digital video processor for decoding a digital signal input from said host into a second digital video signal, a second horizontal synchronous signal and a second vertical synchronous signal, said second horizontal and vertical synchronous signals being input to said synchronous signal switch;
a video signal switch for selectively outputting said first digital video signal input thereto from said analog video processor in response to a first control signal, and for selectively outputting said second digital video signal input thereto from said digital video processor in response to a second control signal, wherein said controller generates said first and second control signals;
said synchronous signal switch selectively outputting said first horizontal and vertical synchronous signals in response to said first control signal, and selectively outputting said second horizontal and vertical synchronous signals in response to said second control signal, wherein said controller receives the first or second horizontal and vertical synchronous signals selectively output from said synchronous signal switch;
a scaler connected to an output of said video signal switch and an output of said synchronous signal switch, said scaler signal-converting the first or second digital video signal selectively output by said video signal switch as an output according to a pre-set resolution; and
a panel driving unit for displaying on a panel the signal converted digital video signal output from the scaling unit.

8. The digital video display as set forth in claim 7, further comprising:
said controller generating said second control signal when it is determined that said DVI-D type connector is connected between said host and said DVI receptacle.

9. The digital video display as set forth in claim 8, further comprising:
said controller operating said digital display device in a power saving mode when the second horizontal synchronous signal is not detected after generating said second control signal; and
said controller operating said digital display device in a normal mode when the second horizontal synchronous signal is detected.

10. The digital video display as set forth in claim 7, further comprising:
said controller operating in a preset switching mode to generate one of said first and second control signals when it is determined that said DVI-I type connector is connected between said host and said DVI receptacle;
said controller determining whether one of said first and second horizontal synchronous signals is input thereto;
said controller operating said digital display device in a normal mode when one of the first and second horizontal synchronous signals is detected;

said controller resetting said switching mode to generate the other of said first and second control signals when one of the first and second horizontal synchronous signals is not detected; and
said controller again determining whether one of said first and second horizontal synchronous signals is input thereto after resetting said switching mode; and
said controller operating said digital display device in a power saving mode when it is determined, after a predetermined number of times, that one of the first and second horizontal synchronous signals is not detected.

11. The digital video display as set forth in claim 7, further comprising:
an on-screen display integrated circuit (OSD-IC) controlled by said controller to provide to said scaler a message digital video signal for displaying on said panel a message indicating the type of DVI-I connector connected between said host and said DVI receptacle; and
said OSD-IC being further controlled by said controller to provide to said scaler an OSD video signal for displaying on said panel a first menu for adjusting digital video signal parameters when it is determined that the DVI-D type connector is connected between said host and said DVI receptacle and a second menu for adjusting analog and digital video signal parameters when it is determined that the DVI-I type connector is connected between said host and said DVI receptacle.

12. The digital video display device as set forth in claim 11, wherein said first menu includes icons for selecting controls corresponding to brightness, image size, image effect, OSD language, OSD position, source selection and information.

13. The digital video display device as set forth in claim 11, wherein said second menu includes icons for selecting controls corresponding to brightness, contrast, image lock, color control, reset, horizontal position, vertical position, image size, image effect, OSD language, OSD position, source selection and information.

14. A method for determining a type of DVI (Digital Visual Interface) connector connected between a host and a digital video display device, said method comprising the steps of:
checking an output of a connector detector to determine whether said output has a low voltage value or a high voltage value;
determining said DVI connector to be a DVI-D (digital only) type connector when the low voltage is detected; and
determining said DVI connector to be a DVI-I (digital and analog) type connector when the high voltage is detected.

15. A method for operating a digital display device comprising the steps of:
determining a type of DVI (Digital Visual Interface) connector connected between a host and said digital video display device, said determining step comprising the steps of:
checking an output of a connector detector to determine whether said output has a low voltage value or a high voltage value;
determining said DVI connector to be a DVI-D (digital only) type connector when the low voltage is detected;
determining said DVI connector to be a DVI-I (digital and analog) type connector when the high voltage is detected; and operating said digital display device in a preset switching mode when it is determined that said DVI connector is a DVI-I type connector, or in a second switching mode when it is determined that said DVI connector is a DVI-D type connector.

16. The method as set forth in claim 15, further comprising the steps of:

converting an analog video signal input from said host into a first digital video signal;

applying a first horizontal synchronous signal and a first vertical synchronous signal to a synchronous signal switch;

decoding a digital signal input from said host into a second digital video signal, a second horizontal synchronous signal and a second vertical synchronous signal;

applying said second horizontal and vertical synchronous signals to said synchronous signal switch;

applying said first and second digital video signals to a video signal switch;

setting said second switching mode when it is determined that said DVI connector is a DVI-D type connector;

controlling said video signal switch to pass said second digital video signal and said synchronous signal switch to pass said second horizontal and vertical synchronous signals, during said second switching mode;

determining whether the second horizontal synchronous signal is passed by said synchronous signal switch, during said second switching mode;

operating said digital display device in a power saving mode when the second horizontal synchronous signal is not detected; and operating said digital display device in a normal mode when the second horizontal synchronous signal is detected.

17. The method as set forth in claim 15, further comprising the steps of:

converting an analog video signal input from said host into a first digital video signal;

applying a first horizontal synchronous signal and a first vertical synchronous signal to a synchronous signal switch;

decoding a digital signal input from said host into a second digital video signal, a second horizontal synchronous signal and a second vertical synchronous signal;

applying said second horizontal and vertical synchronous signals to said synchronous signal switch;

applying said first and second digital video signals to a video signal switch;

operating said digital display device in said preset switching mode when it is determined that said DVI connector is a DVI-I type connector, said preset switching mode being a predetermined one of said first switching mode or said second switching mode;

controlling said video signal switch to pass said first digital video signal and said synchronous signal switch to pass said first horizontal and vertical synchronous signals, during the first switching mode if said preset switching mode is said first switching mode;

determining whether the first horizontal synchronous signal is passed by said synchronous signal switch, during said first switching mode;

changing to the second switching mode when it is determined that the first horizontal synchronous signal is not passed by said synchronous signal switch during said first switching mode;

determining whether the second horizontal synchronous signal is passed by said synchronous signal switch, during said second switching mode;

changing to the first switching mode when it is determined that the second horizontal synchronous signal is not passed by said synchronous signal switch during said second switching mode;

operating said digital display device in a power saving mode when it is determined that neither the first horizontal synchronous signal nor the second horizontal synchronous signal are detected after repeating the changing steps a predetermined number of times; and operating said digital display device in a normal mode when the first horizontal synchronous signal or second horizontal synchronous signal is detected.

* * * * *